(12) United States Patent
Okiyama et al.

(10) Patent No.: US 7,091,146 B2
(45) Date of Patent: Aug. 15, 2006

(54) ENHANCED CERAMIC MATERIAL FOR PRECISION ALIGNMENT MECHANISM

(75) Inventors: Yoshiharu Okiyama, Kaga (JP); Ryo Yamaguchi, Kaga (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 10/895,091

(22) Filed: Jul. 21, 2004

(65) Prior Publication Data

US 2004/0266606 A1   Dec. 30, 2004

Related U.S. Application Data

(63) Continuation of application No. PCT/JP03/011538, filed on Sep. 10, 2003.

(30) Foreign Application Priority Data

Sep. 12, 2002   (JP) ............... 2002-267186

(51) Int. Cl.
*C01B 35/117* (2006.01)
(52) U.S. Cl. ...................... 501/128; 501/153
(58) Field of Classification Search ............... 501/128, 501/127, 153
See application file for complete search history.

(56) References Cited

U.S. PATENT DOCUMENTS 3,791,833 A * 2/1974 Sugiura et al. ............ 501/153
5,658,838 A * 8/1997 Trabelsi ..................... 501/153
5,830,819 A * 11/1998 Shikata et al. ............. 501/153

FOREIGN PATENT DOCUMENTS

| EP | 0 339 903 | 4/1989 |
| EP | 1 205 452 | 6/2000 |
| JP | 62-094953 | 5/1987 |
| JP | 1-22225 | 4/1989 |
| JP | 08067553 | * 3/1996 |
| JP | 8-139168 | 5/1996 |
| JP | 8-262090 | 10/1996 |
| JP | 10-95673 | 4/1998 |
| JP | 11-189458 | 7/1999 |
| JP | 11-245133 | 9/1999 |
| JP | 2001-019540 | 1/2001 |

* cited by examiner

*Primary Examiner*—David Sample
(74) *Attorney, Agent, or Firm*—McDermott Will & Emery LLP

(57) ABSTRACT

Ceramics containing 80 wt % or greater of alumina ($Al_2O_3$), with Mn, Ti, Fe, Si, Ca and Mg, with Mn—Al spinal ($MnO.Al_2O_3$) crystals and anorthite crystals ($CaO.Al_2O_3.2SiO_2$) generated by calcination, and having a volume resistivity of $1 \times 10^{11}$ Ω·cm or less. Preferably, the ceramics contains a combined weight of 2–11 wt % or greater of Mn, Ti and Fe as the oxides, 0.5 wt % or greater of Mn as manganese dioxide ($MnO_2$), 0.5 wt % or greater of Ti as titanium oxide ($TiO_2$), and 0.5 wt % or greater of Fe as iron oxide ($Fe_2O_3$).

10 Claims, 7 Drawing Sheets sample No. 5 sample No. 6 sample No. 7

FIG.5  sample No. 5
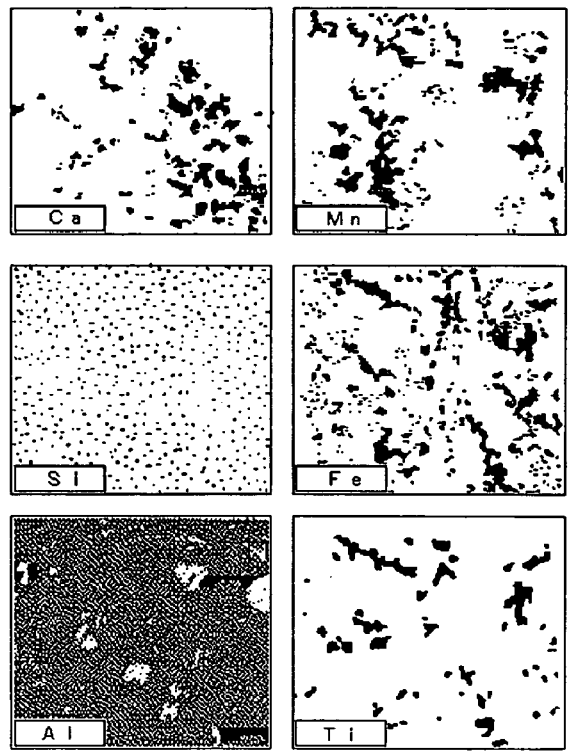
FIG.6  sample No. 7
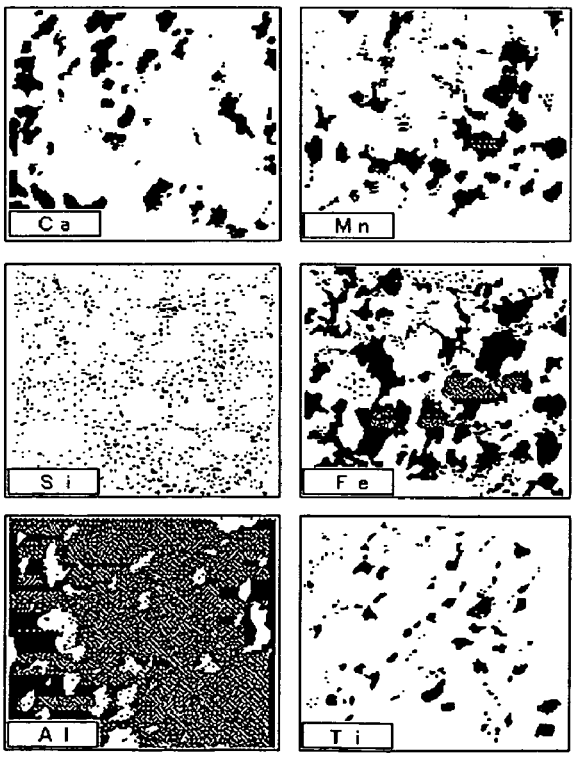

sample No. 1 sample No. 5

ENHANCED CERAMIC MATERIAL FOR PRECISION ALIGNMENT MECHANISM

CROSS-REFERENCES TO RELATED APPLICATIONS

This application is a continuation of PCT/JP2003/011538, filed Sep. 10, 2003, which claims priority to JP 2002-267186, filed Sep. 12, 2002.

TECHNICAL FIELD

The present invention relates to ceramics suitable for a precision chuck for holding a glass substrate for an FPD (flat panel display), for example, a vacuum chuck or an electrostatic chuck, and to a ceramics manufacturing method.

BACKGROUND ART

In FPD manufacturing devices and semiconductor manufacturing devices, various types of precision chuck or support platform are used to hold a glass substrate or semiconductor wafer. These devices are generally averse to unnecessary reflected or transmitted light.

Japanese Patent Laid-open No. 8-262090 discloses a support platform on which a glass substrate for an LCD (Liquid Crystal Display) is mounted, and which is subjected to alumite processing and blackened. Light is randomly reflected at the surface of the blackened support platform and also absorbed, which means that undesired halation that causes reflection of light is prevented.

Japanese Patent Laid-open No, 8-139168 discloses a vacuum chuck of ceramics formed with a thin film layer of low reflectance. Recently, since it has become possible to provide larger FPD substrates and wafers, there has been an increased demand for ceramics chucks of high specific rigidity (young's modulus/specific gravity). Compared to aluminum, which has a specific rigidity of 28 GPa·cm$^3$/g, Alumina ceramics or AlN ceramics have a specific rigidity of 80–95 GPa·cm$^3$/g or 90–95 GPa·cm$^3$/g.

Japanese Patent Laid-open Nos. 2001-019540 and 10-095673 respectively disclose blackened ceramics with a base of cordierite, and blackened ceramics with a base of AlN. These blackened ceramics are the same insulators as an FPD substrate. If a chuck made of insulating ceramics is brought into contact with an FPD substrate, electrostatic polarization occurs inside the substrate. As a result of this, spark discharge occurs and the substrate is damaged.

Japanese Patent Laid-open No. 11-245133 describes problems caused by electrostatic polarization that occurs, for example, when manufacturing a slider for a magnetic head. A plurality of sliders are obtained by cutting a slider bar having a plurality of thin film elements formed thereon. If the slider bar is joined to an insulating jig, electrical charge is polarized inside the metal layer of the thin film elements. This publication discloses using a jig of semiconductive ceramics in order to solve this problem caused by electrostatic polarization. Surface resistivity of the disclosed jig is within a range of greater than or equal to $1\times10^6$ ohms per square to less than $1\times10^{12}$ ohms per square.

Semiconductor ceramics having a base of alumina ($Al_2O_3$) with 0.5–2 wt % $TiO_2$ added is known from Japanese Patent laid-open No. 62-094953. This alumina ceramics is calcinated in a reducing atmosphere.

Japanese Patent laid-open No. 11-189458 discloses semiconductor ceramics having a volume resistivity of $10^4$–$10^{12}$ Ω·cm, and a withstand voltage of 10 kV/mm or greater. This semiconductor ceramics contains alumina crystal grains of 40–85% by volume, and one or more of $MnNb_2O_6$, $Mn_2AlO_4$, and $MnFe_2O_4$. Comparatively inexpensive alumina is generally calcinated in an ordinary atmosphere, which means that it is possible to manufacture semiconductor ceramics on a large scale.

The object of the present invention is to provide an alumina ceramics having high specific rigidity by including alumina, which is the main component, in a high proportion.

Another object of the present invention is to provide ceramics that satisfies the requirements of low reflectance and semiconductivity, without excessively lowering the proportion of alumina.

DISCLOSURE OF THE INVENTION

Ceramics of the present invention contains 80 wt % or greater of alumina, with Mn, Ti, Fe, Si, Ca and Mg, with Mn—Al spinal ($MnO.Al_2O_3$) crystals and anorthite crystals ($CaO.Al_2O_3.2SiO_2$) generated by calcination, and having a volume resistivity of $1\times10^{11}$ Ω·cm or less.

Preferably, the ceramics contains a combined weight of 2–11 wt % or greater of Mn, Ti and Fe as the oxides, 0.5 wt % or greater of Mn as manganese dioxide ($MnO_2$), 0.5 wt % or greater of Ti as titanium oxide ($TiO_2$), and 0.5 wt % or greater of Fe as iron oxide ($Fe_2O_3$).

Also, preferably, the ceramics contains a combined weight of 6–9 wt % or greater of Si, Ca and Mg as the oxides, 4 wt % or greater of Si as silicon dioxide ($SiO_2$), 0.4 wt % or greater of Ca as calcium oxide (CaO), and 0.4 wt % or greater of Mg as magnesium oxide (MgO).

According to the present invention, a ceramics manufacturing method comprises:

forming a compacted body using mixed powder containing alumina as main components with manganese dioxide ($MnO_2$), titanium oxide ($TiO_2$), iron oxide ($Fe_2O_3$), and silica stone or clay, calcite, dolomite and magnesite, and generating Mn—Al spinel crystals and anorthite crystals by calcinating the compacted body in an LPG furnace or an electrical furnace at 1,300–1,450° C.

Other novel features will become clear upon reference to the following description.

BRIEF DESCRIPTION OF THE DRAWINGS

The details of the present invention, both as to its structure and operation can best be understood by referring to the following description with reference to the accompanying drawings in which:

FIG. 5 is molecular maps of sample No. 5 using EPMA;

FIG. 6 is molecular maps of sample No. 7 using EPMA;

DETAILED DESCRIPTION OF THE PREFERRED EMBODIMENTS

Figure 1:
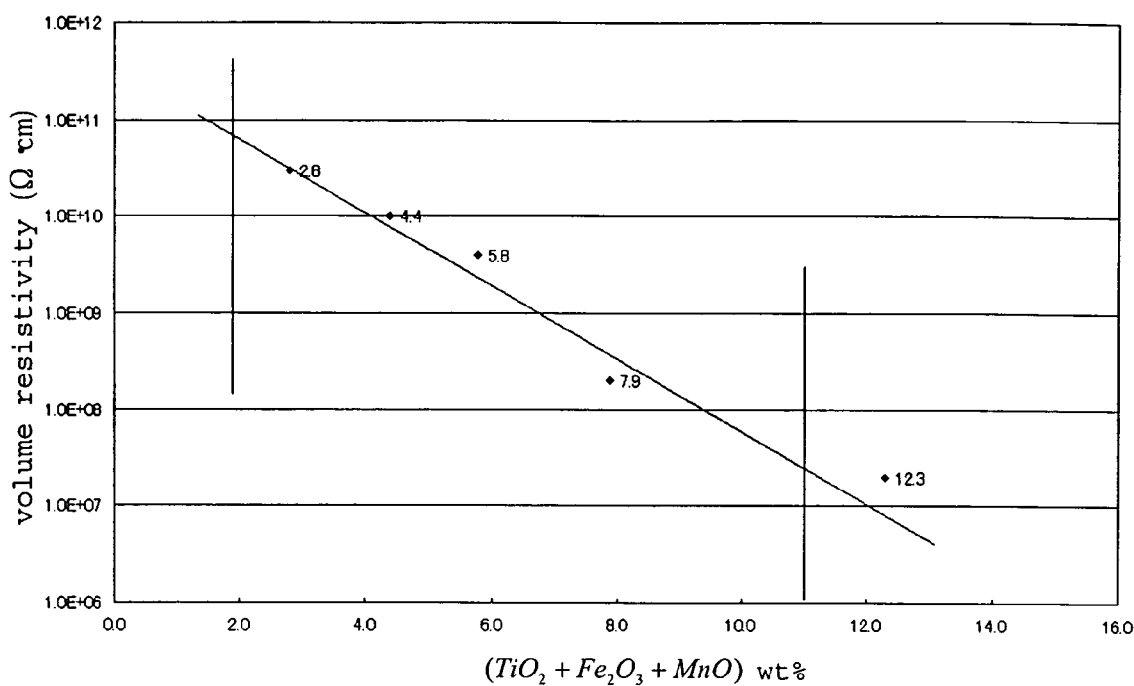
FIG. 1 is a graph showing volume resistivity of ceramics as a function of total weight ratio of Mn, Ti and Fe.

First of all, after weighing, manganese dioxide ($MnO_2$) powder, titanium oxide ($TiO_2$) powder, iron oxide ($Fe_2O_3$) powder, powdered silica stone or clay, powdered dolomite, powdered calcite and powdered magnesite are mixed with alumina ($Al_2O_3$) powder, being a main component. Next, slurry is generated by wet milling the mixed powder. The slurry is then dried using a spray drying method, to generate a base powder. The base powder is press formed and calcinated at a temperature of 1,300–1,650° C. in an electrical furnace. In this way, ceramics sintered body samples having a base of alumina (sample Nos. 1–8) were obtained. Ceramics for sample numbers 4 to 7 are example embodiments according to the present invention, while the ceramics of sample numbers 1 to 3 and 8 are comparative examples. Table 1 shows composition, calcination temperature, physical characteristics, volume resistivity, crystal phase, total reflectance and specular reflectance for each sample.

Ca and Mg are respectively converted to $SiO_2$, CaO and MgO. Sample No. 1 represents ceramics containing an extremely high proportion of alumina as a main component. The ceramics of sample Nos. 1–3 do not contain MnO.

With respect to specific gravity on Table 1, about 30 mm square samples of thickness of 20 mm were prepared, and measurement was carried out using the Archimedes method. Samples of 100 mm×20 mm×2 mm were prepared, and Young's modulus was measured using a sonic test provided in JIS (Japan Industrial Standard) R1602. Specific rigidity was calculated dividing Young's modulus by specific gravity. The ceramics have specific rigidity of 65 GPa·cm$^3$/g or higher, so as to be able to use also with a large precision alignment mechanism or support platform. The high purity alumina ceramics of sample number 1 has a specific rigidity of 94.9 GPa·cm$^3$/g. On the other hand, the ceramics of sample number 8 has a specific rigidity of 59.5 GPa·cm$^3$/g, which is less than 70% of the specific rigidity of sample

TABLE 1

| | | sample number | | | | | | | |
|---|---|---|---|---|---|---|---|---|---|
| | | 1 | 2 | 3 | 4 | 5 | 6 | 7 | 8 |
| composition wt % | $Al_2O_3$ | 99.5 | 92.1 | 91.1 | 89.6 | 88.1 | 85.9 | 83.0 | 79.3 |
| | $TiO_2$ | 0.0 | 0.0 | 1.1 | 1.1 | 1.1 | 1.5 | 2.0 | 2.7 |
| | $Fe_2O_3$ | 0.0 | 0.1 | 0.1 | 1.0 | 2.0 | 2.6 | 3.5 | 5.8 |
| | MnO | 0.0 | 0.0 | 0.0 | 0.7 | 1.3 | 1.6 | 2.4 | 3.8 |
| | $SiO_2$ | 0.0 | 6.3 | 6.2 | 6.1 | 6.0 | 6.6 | 6.8 | 6.1 |
| | CaO | 0.0 | 0.7 | 0.7 | 0.7 | 0.7 | 0.7 | 1.3 | 1.3 |
| | MgO | 0.4 | 0.4 | 0.4 | 0.4 | 0.4 | 0.8 | 0.7 | 0.6 |
| | $Na_2O$ | 0.1 | 0.4 | 0.4 | 0.4 | 0.4 | 0.2 | 0.2 | 0.4 |
| | $K_2O$ | 0.0 | 0.0 | 0.0 | 0.0 | 0.0 | 0.0 | 0.1 | 0.0 |
| | sum | 100.0 | 100.0 | 100.0 | 100.0 | 100.0 | 100.0 | 100.0 | 100.0 |
| composition wt % | $TiO_2$ + $Fe_2O_3$ + MnO | 0.0 | 0.1 | 1.2 | 2.8 | 4.4 | 5.8 | 7.9 | 12.3 |
| | $SiO_2$ + CaO + MgO | 0.4 | 7.3 | 7.3 | 7.2 | 7.1 | 8.1 | 8.8 | 8.0 |
| calcination | temperature° C. | 1650° C. | 1500° C. | 1400° C. | 1400° C. | 1400° C. | 1400° C. | 1350° C. | 1300° C. |
| specific gravity | | 3.9 | 3.6 | 3.5 | 3.6 | 3.5 | 3.4 | 3.4 | 3.3 |
| young's modulus | GPa | 370 | 310 | 295 | 290 | 280 | 235 | 230 | 195 |
| specific rigidity | young's modulus/specific gravity | 94.9 | 86.1 | 85.5 | 81.7 | 80.0 | 69.1 | 68.7 | 59.5 |
| volume resistivity | Ω · cm | 1.0E+14 | 8.0E+13 | 4.0E+13 | 3.0E+10 | 1.0E+10 | 4.0E+09 | 2.0E+08 | 2.0E+07 |
| crystal phase (quantity) | alumina ($Al_2O_3$) | large | large | large | large | large | large | large | large |
| | anorthite ($CaO \cdot Al_2O_3 \cdot 2SiO_2$) | — | small | small | small | small | small | small | small |
| | Mn-Al spinel ($MnO \cdot Al_2O_3$) | — | — | — | very small | small | smaller | medium | medium |
| | ilmenite ($FeO \cdot TiO_2$) | — | — | — | very small | very small | med. | — | — |
| | rutile ($TiO_2$) | — | — | very small | — | — | very small | — | — |
| total reflectance % | wave length of light 220 nm | 40.0 | | | 22.5 | 22.0 | 12.0 | 11.5 | 10.0 |
| | 250 nm | 24.3 | | | 15.0 | 14.6 | 10.7 | 10.3 | 8.6 |
| | 300 nm | 38.0 | | | 14.9 | 14.7 | 10.7 | 10.4 | 8.5 |
| | 350 nm | 48.8 | | | 14.9 | 15.0 | 11.1 | 11.1 | 8.7 |
| | 400 nm | 57.8 | | | 15.8 | 15.6 | 12.1 | 11.9 | 9.5 |
| | 450 nm | 61.7 | | | 17.4 | 15.5 | 12.4 | 12.0 | 9.8 |
| | 500 nm | 67.2 | | | 20.2 | 15.9 | 13.1 | 12.4 | 10.6 |
| | 550 nm | 71.5 | | | 18.6 | 16.5 | 13.7 | 13.0 | 11.3 |
| | 600 nm | 72.3 | | | 19.7 | 17.1 | 14.1 | 13.8 | 11.8 |
| | 700 nm | 74.0 | | | 27.1 | 18.9 | 14.5 | 15.2 | 12.2 |
| | 800 nm | 72.2 | | | 29.8 | 21.7 | 14.9 | 17.0 | 12.8 |
| specular reflectance % | wave length of light 220 nm | 1.6 | | | 0.9 | 0.8 | 0.7 | 0.7 | 0.7 |
| | 250 nm | 1.2 | | | 0.8 | 0.7 | 0.7 | 0.6 | 0.6 |
| | 300 nm | 1.7 | | | 0.8 | 0.8 | 0.7 | 0.7 | 0.6 |
| | 350 nm | 2.2 | | | 0.9 | 0.9 | 0.8 | 0.8 | 0.7 |
| | 400 nm | 2.5 | | | 0.9 | 0.9 | 0.8 | 0.8 | 0.7 |
| | 450 nm | 2.6 | | | 1.0 | 0.9 | 0.8 | 0.8 | 0.7 |
| | 500 nm | 2.8 | | | 1.1 | 0.9 | 0.8 | 0.8 | 0.8 |
| | 550 nm | 3.1 | | | 1.1 | 1.0 | 0.9 | 0.9 | 0.8 |
| | 600 nm | 3.1 | | | 1.1 | 1.0 | 0.9 | 0.9 | 0.9 |
| | 700 nm | 3.3 | | | 1.4 | 1.1 | 1.0 | 1.0 | 0.9 |
| | 800 nm | 3.7 | | | 2.0 | 1.7 | 1.4 | 1.5 | 1.4 |

The weight ratio of each component is shown as the oxides in table 1. The weight ratio of Al, Ti, Fe and Mn are respectively converted to $Al_2O_3$, $TiO_2$, $Fe_2O_3$ and MnO. Si, number 1. The ceramics of sample number 8 has a decreased specific rigidity, and the ceramics is required to contain 80 wt % or more of alumina.

100 mm square samples having thickness of 20 mm were ground using a grain 140 diamond grinding wheel at upper and lower surfaces until the thickness was 6 mm. Electrodes were coated on both ends of the samples, and resistance value r was measured using an insulation ohmmeter. Volume resistivity R was obtained in the following manner.

$$R = r \times S/t$$

S is surface area of the ohmmeter electrodes, and t is sample thickness.

If the ceramics for a precision chuck has a volume resistivity of $1 \times 10^{11}$ Ω·cm or less, damage to the substrate for FPD caused by electrostatic polarization is reliably prevented. The ceramics of sample No. 4–8 satisfies this type of low volume resistivity. Referring to sample Nos. 1–3, conductivity does not occur in ceramics that does not contain Mn. The ceramics of sample No. 3 contains 1.1 wt % of Ti and 0.1 wt % of Fe, but is not semiconductive. The ceramics of sample No. 4 contains 0.7 wt % of Mn. Therefore, the ceramics preferably contains 0.5 wt % or more of Mn to appear semiconductive. The ceramics of sample Nos. 4–8 contain 0.5 wt % of Ti and 0.5 wt % of Fe, in addition to Mn. Also, the ceramics of sample Nos. 4–8 contains $SiO_2$, CaO and MgO in a combined amount of 6–9 wt %. Referring to the graph of FIG. 1, it will be understood that if the total weight ratio of $TiO_2$, $Fe_2O_3$ and MnO becomes large, the volume resistivity becomes lower. Referring to samples 2–3, conductivity does not appear in ceramics that contains less than a total of 2 wt % of $TiO_2$, $Fe_2O_3$ and MnO. Therefore, the alumina ceramics preferably contains a total of 2 wt % or more of $TiO_2$, $Fe_2O_3$ and MnO to appear semiconductive.

Figure 2:
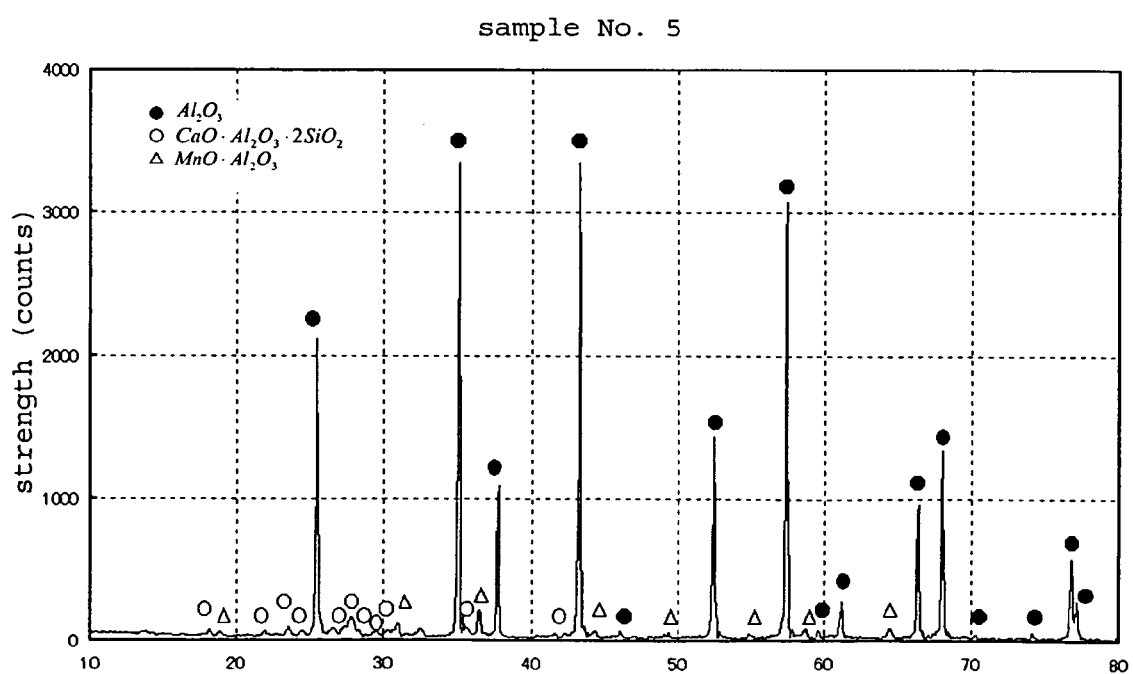
FIG. 2 is an X-ray diffraction pattern for sample No. 5.
Figure 3:
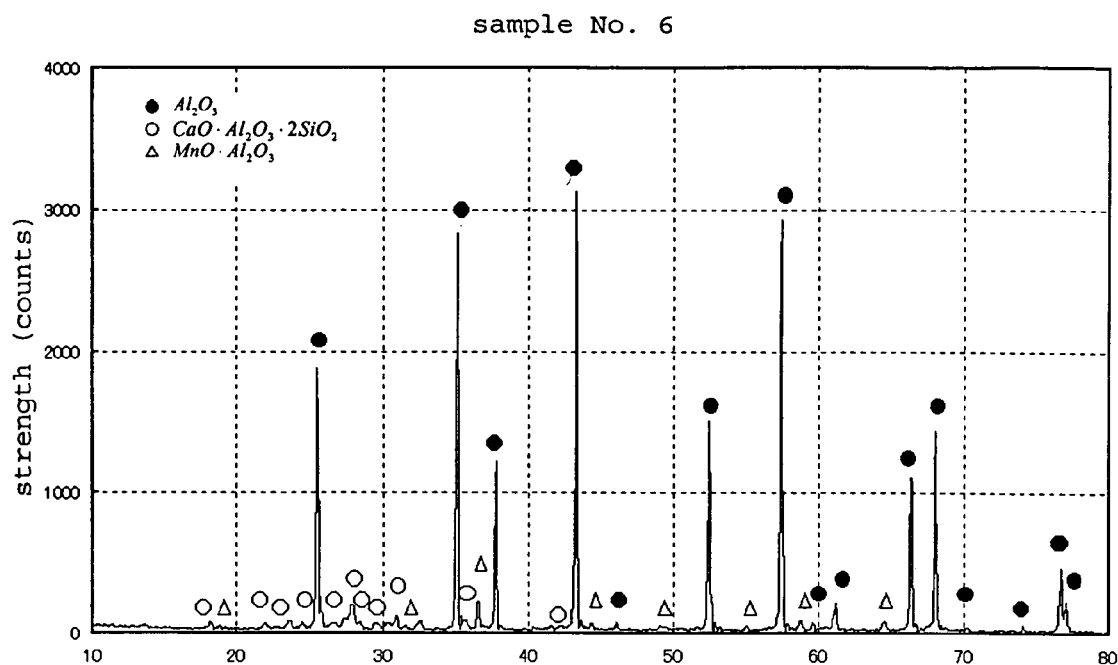
FIG. 3 is an X-ray diffraction pattern for sample No. 6.
Figure 4:
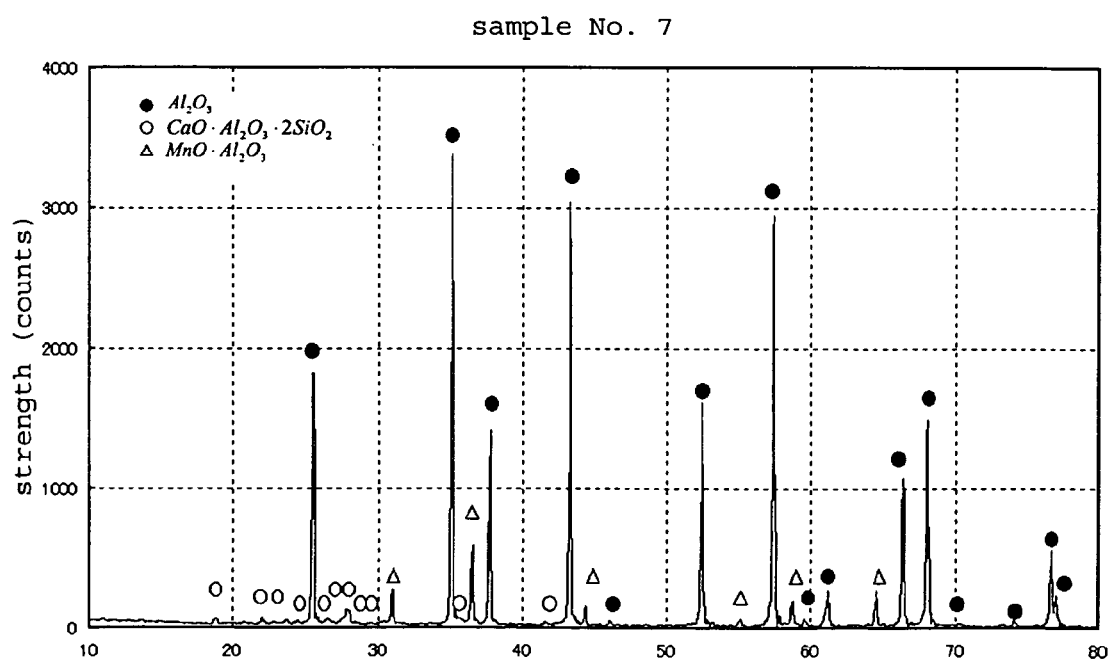
FIG. 4 is an X-ray diffraction pattern for sample No. 7.
Figure 7:
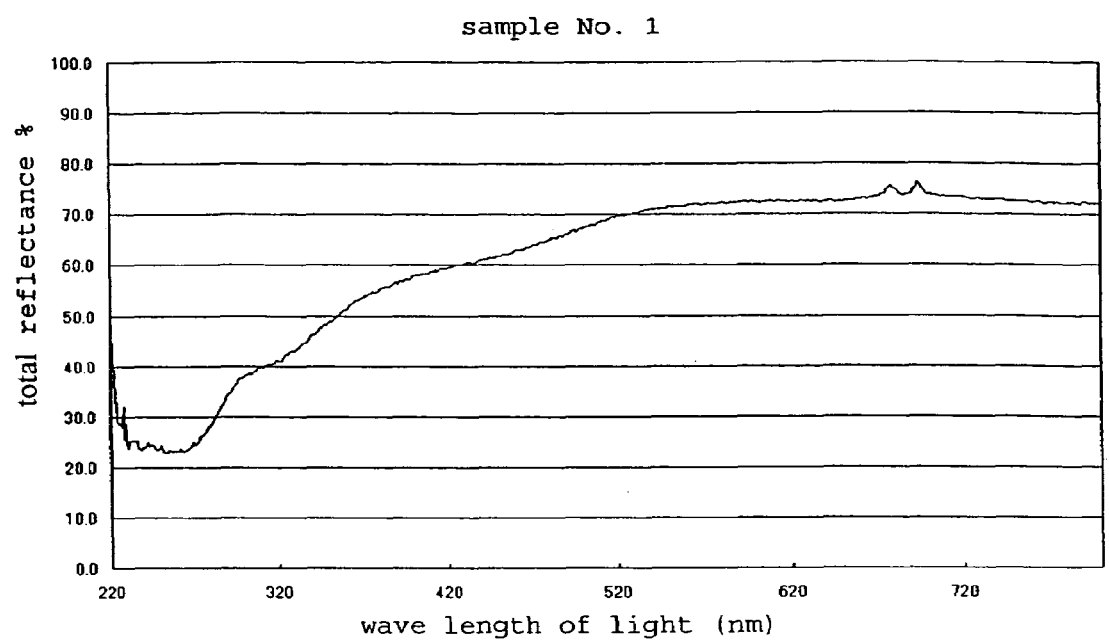
FIG. 7 shows total reflectance for sample No. 1.
Figure 8:
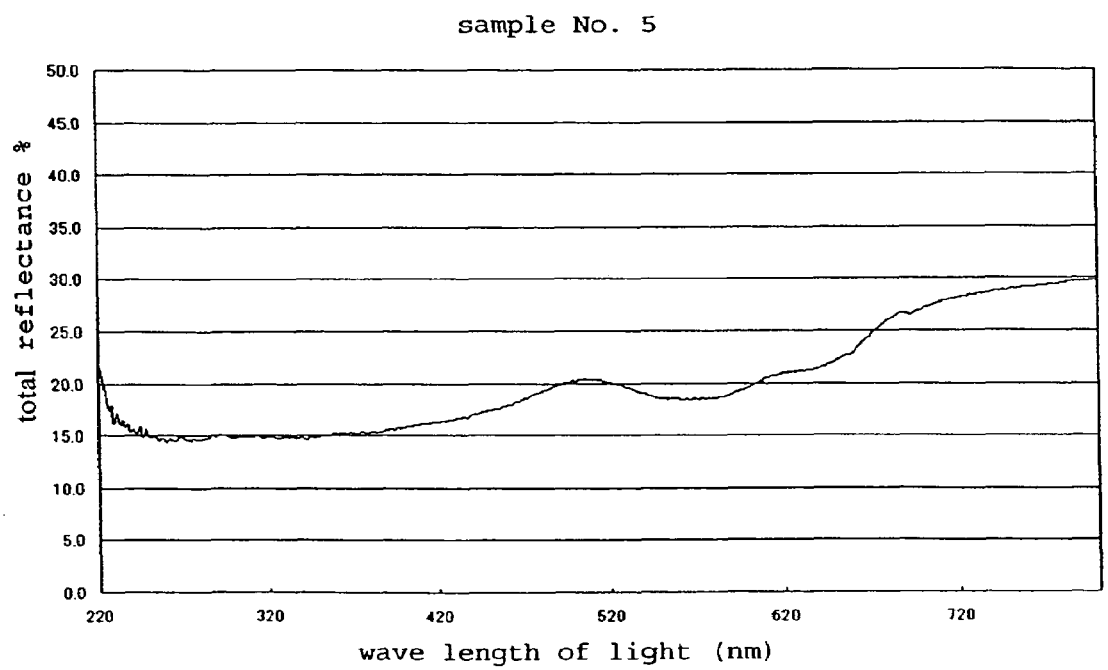
FIG. 8 shows total reflectance for sample No. 5.
Figure 9:
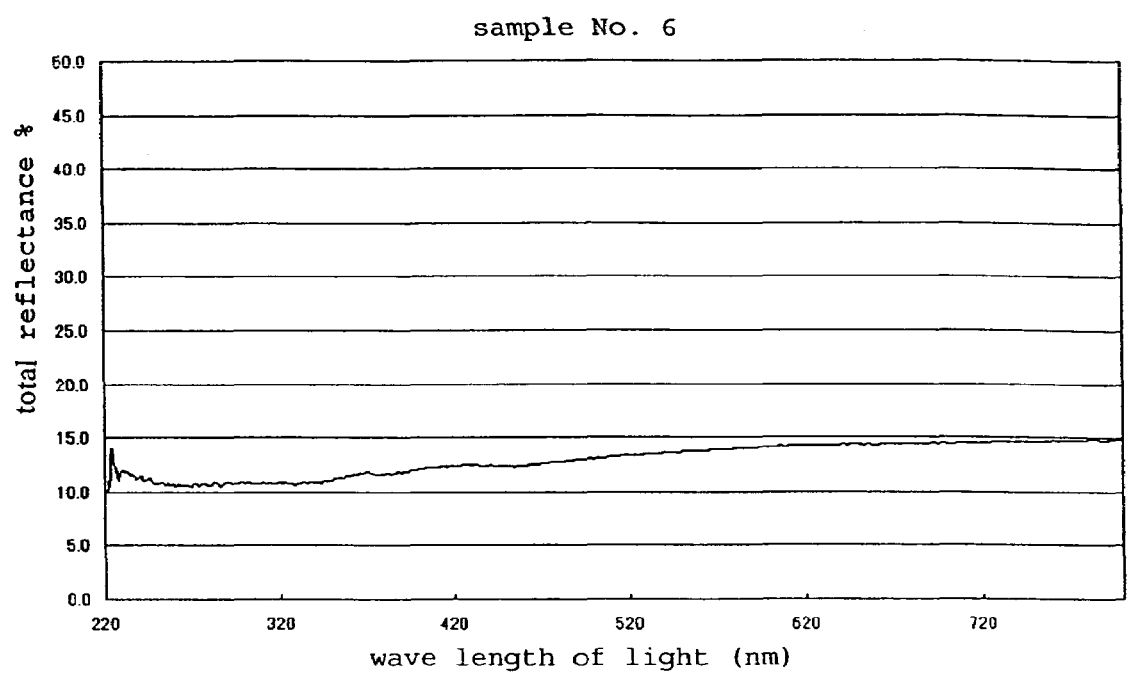
FIG. 9 shows total reflectance for sample No. 6.
Figure 10:
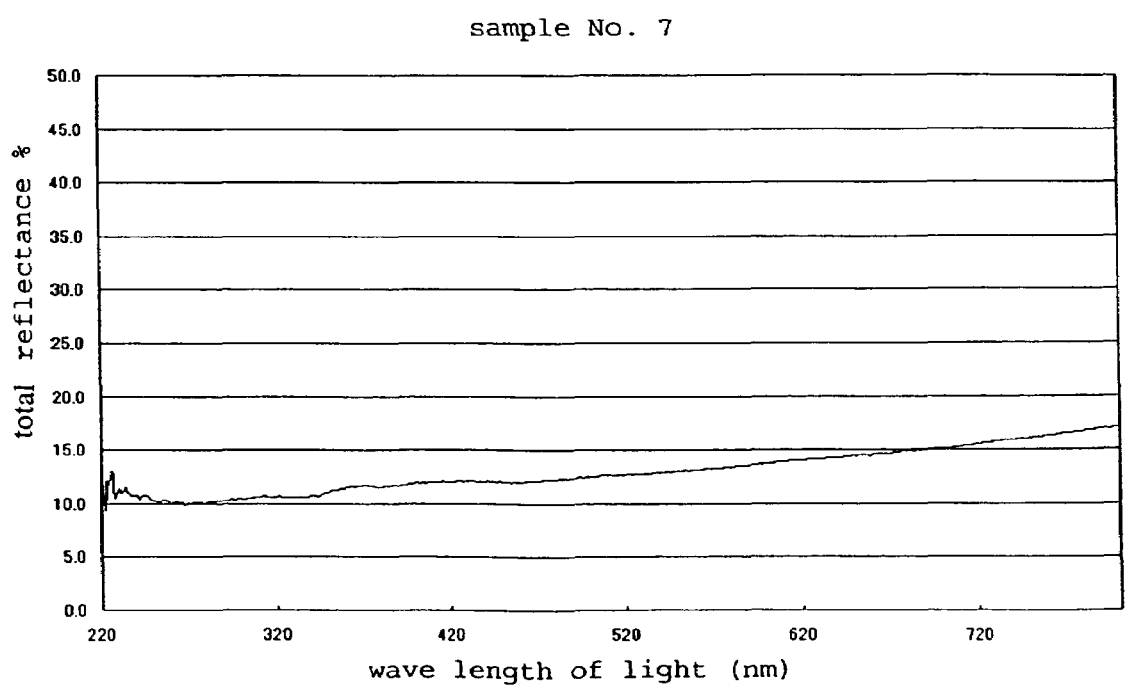
FIG. 10 shows total reflectance for sample No. 7.
Figure 11:
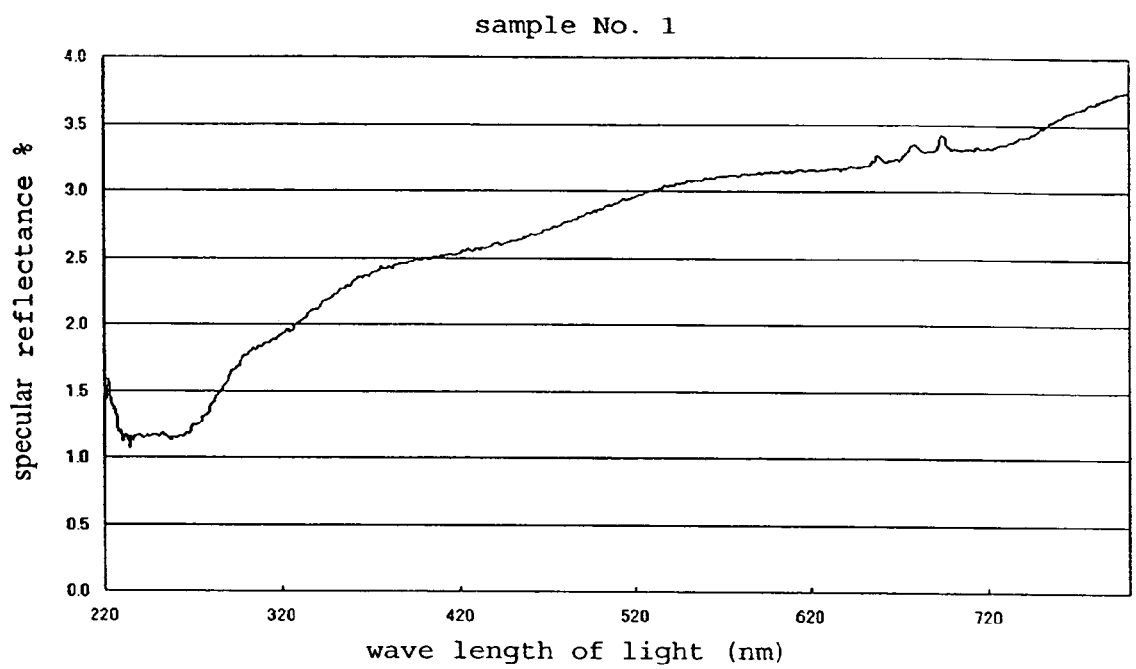
FIG. 11 shows specular reflectance for sample No. 1.
Figure 12:
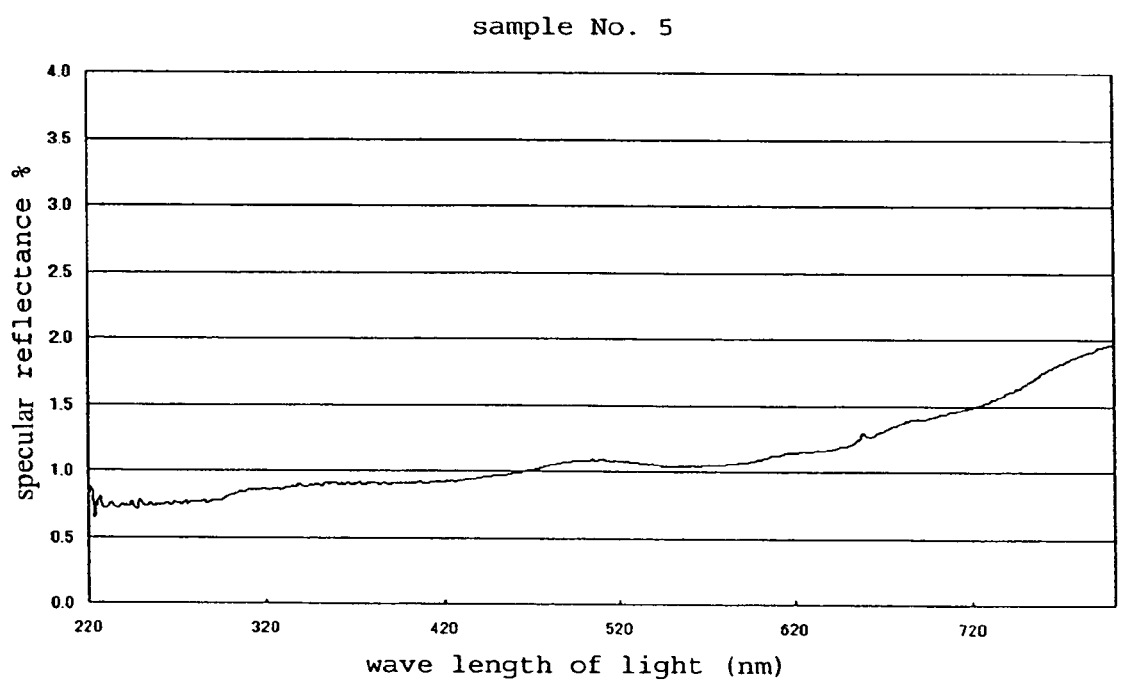
FIG. 12 shows specular reflectance for sample No. 5.
Figure 13:
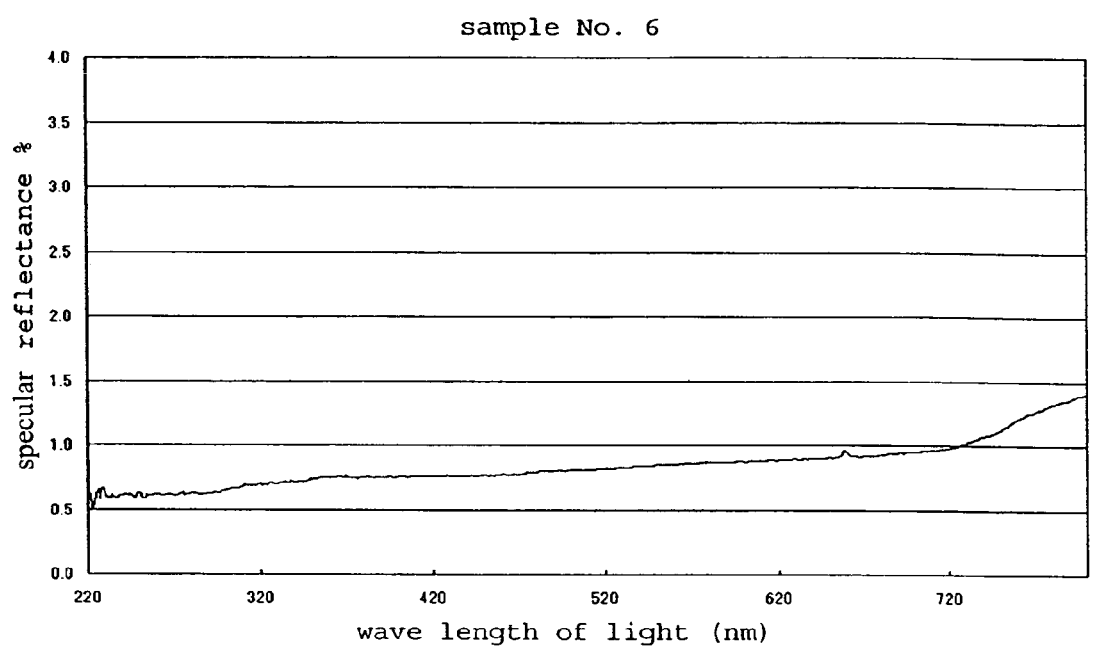
FIG. 13 shows specular reflectance for sample No. 6.
Figure 14:
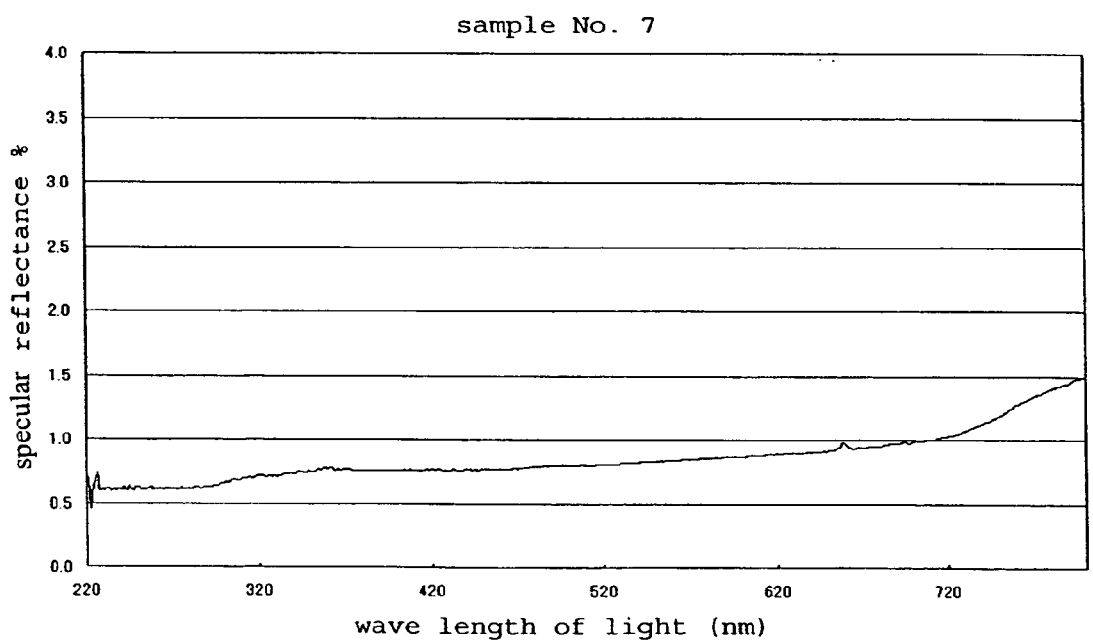
FIG. 14 shows specular reflectance for sample No. 7.

A splinter of each sample was crushed using a mortar, and crystal analysis carried out using an X-ray diffractometer. The crystal amounts shown in Table 1 were determined based on X-ray diffraction strength. FIGS. 2, 3 and 4 show X-ray diffraction patterns for the ceramics of sample numbers 5, 6 and 7, respectively. The ceramics of sample numbers 4 to 8 were judged to be mainly composed of crystals of alumina ($Al_2O_3$), Mn—Al spinel (MnO $Al_2O_3$) and anorthite (CaO $Al_2O_3$.$2SiO_2$). Regarding the ceramics of sample numbers 4 to 6, there are microscopic amounts of crystals composed of Ti or Fe. Crystals formed from Ti or Fe are not contained in sample numbers 7 and 8. Therefore, most of Ti and Fe is dissolved in the Mn—Al spinel crystals, and, as a result, conductivity is efficiently imparted using lattice imperfections inside generated non-stoichiometric compounds.

The state where oxygen is lacking at crystal interstices is called an oxygen-deficient lattice defect. The state where there is too much oxygen at crystal interstices is called an excessive oxygen, or metal deficient, lattice defect. Both types of lattice defect arise in $TiO_2$, which is a 3d transition metal oxide. $TiO_2$ has a wide range of non-stoichiometry. A combination of oxygen-deficient lattice defects and excessive oxygen lattice defects arises in oxides of Fe, which is a 3d transition metal. Ti and Fe, whose oxides easily form non-stoichiometric compounds, can be made to exhibit a lot of lattice defects without excessively lowering the proportion of alumina.

Splinters of sample numbers 5 and 7 were subjected to buffing using a diamond abrasive. These splinters were analyzed for each of the elements of Mg, Ca, Al, Fe, Si, Mn and Ti using electron probe microanalysis ("EPMA"). FIGS. 4 and 5 show element maps for sample No. 5 and sample No. 7, respectively. The non-uniform distribution range of Mn is at places where Mn—Al spinel crystals are generated, and overlaps with the distribution range of Fe or Ti. The non-uniform distribution range of Ca is at places where anorthite crystals are generated, and is extremely close to the distribution range of Mn, Ti and Fe. It is estimated that each component was separated by a cooling process, to produce Mn—Al spinel crystals and anorthite crystals. Alternatively, it is estimated that under the high temperature of a calcination process Mn—Al spinel crystals were produced at a molten glass interface. In either case, the production of anorthite crystals contributes to the overlapping distribution of Mn, Ti and Fe.

A 100 mm square sample (the same size as that used for measurement of volume resistivity) was used to measure optical reflectance. Light having a wavelength of 220–800 nm was irradiated to the sample surface. A spectacular reflectance was obtained by detecting light reflected at 0 degrees, and total reflectance was obtained by further detecting light that was diffuse reflected. The surface roughness of the sample was 0.6 μRa. The measurement supposed that the total reflectance of barium carbonate powder pressure compacted body was 100% and that the specular reflectance of a mirror finished aluminum material was 100%. FIGS. 7 to 10 show total reflectance for sample numbers 1, 5, 6 and 7 in a wavelength range of 220–800 nm, respectively. FIGS. 11 to 14 show respectively specular reflectance for the same samples, respectively. Total reflectance was 10.3–15.0% for wavelength 220–350 nm, 11.9–16.5% for wavelength 400–550 nm, and 13.8–21.7% for wavelength 600–800 nm. Specular reflectance was 0.6–0.9% for wavelength 220–350 nm, 0.8–1.0% for wavelength 400–550 nm, and 0.9–1.7% for wavelength 600–800.

Table 2 shows reflectance ratios for sample numbers, for the case where reflectance of sample number 1 is 100%. From Table 2, the total reflectance of sample numbers 5–8 is 18–62% of that of sample number 1. Also, the specular reflectance of sample numbers 5 to 8 is 28–67% of that of sample number 1.

TABLE 2

| | | | sample number | | | |
|---|---|---|---|---|---|---|
| | | | 5 | 6 | 7 | 8 |
| | | | comparison to sample No. 1 | | | |
| total reflectance % | wave length of light | 220 nm | 56.3% | 55.0% | 30.0% | 28.8% |
| | | 250 nm | 61.6% | 60.2% | 44.2% | 42.2% |
| | | 300 nm | 39.2% | 38.7% | 28.2% | 27.5% |
| | | 350 nm | 30.5% | 30.7% | 22.8% | 22.7% |
| | | 400 nm | 27.4% | 27.0% | 20.9% | 20.7% |
| | | 450 nm | 28.2% | 25.2% | 20.1% | 19.4% |
| | | 500 nm | 30.1% | 23.7% | 19.5% | 18.5% |
| | | 550 nm | 26.0% | 23.0% | 19.2% | 18.2% |
| | | 600 nm | 27.2% | 23.7% | 19.6% | 19.0% |
| | | 700 nm | 36.6% | 25.5% | 19.5% | 20.5% |
| | | 800 nm | 41.3% | 30.0% | 20.6% | 23.6% |
| specular reflectance % | wave length of light | 220 nm | 56.3% | 50.0% | 43.8% | 43.8% |
| | | 250 nm | 66.7% | 61.9% | 54.3% | 53.9% |
| | | 300 nm | 46.8% | 46.1% | 40.3% | 39.7% |
| | | 350 nm | 41.6% | 40.9% | 35.7% | 35.3% |
| | | 400 nm | 36.5% | 36.2% | 32.2% | 31.5% |
| | | 450 nm | 38.4% | 34.3% | 31.0% | 30.2% |
| | | 500 nm | 38.7% | 32.4% | 29.8% | 28.7% |
| | | 550 nm | 36.0% | 31.4% | 29.0% | 27.9% |
| | | 600 nm | 35.1% | 32.0% | 29.1% | 28.5% |
| | | 700 nm | 42.3% | 34.3% | 29.8% | 30.4% |
| | | 800 nm | 53.4% | 45.2% | 38.5% | 40.4% |

A powders compacted body the same as that of Sample Nos. 6 and 7 was calcinated into ceramics using an LPG furnace instead of the electrical furnace. Table 3 shows characteristics of these ceramics, and they all have sufficiently high rigidity, low volume resistivity and low reflectance.

TABLE 3

|  |  | sample number | |
| --- | --- | --- | --- |
|  |  | 6 | 7 |
| calcination | temperature ° C. | 1400° C. | 1350° C. |
| specific gravity | Gpa | 3.4 | 3.4 |
| young's modulus | young's modulus/specific | 232 | 225 |
| specific rigidity | gravity | 68.2 | 67.2 |
| volume resistivity | $\Omega \cdot cm$ | 3.0E+09 | 1.0E+08 |
| crystal phase | alumina ($Al_2O_3$) | large | large |
| (quantity) | anorthite ($CaO \cdot Al_2O_3 \cdot 2SiO_2$) | small | small |
|  | Mn-Al spinel ($MnO \cdot Al_2O_3$) | smaller | medium |
|  | ilmenite ($FeO \cdot TiO_2$) | med. | — |
|  | rutile ($TiO_2$) | very small | — |
| total reflectance % | wave length of light 220 nm | 12.0 | 12.0 |
|  | 250 nm | 10.7 | 10.3 |
|  | 300 nm | 10.7 | 10.4 |
|  | 350 nm | 11.1 | 11.1 |
|  | 400 nm | 12.1 | 11.9 |
|  | 450 nm | 12.4 | 12.0 |
|  | 500 nm | 13.1 | 12.4 |
|  | 550 nm | 13.7 | 13.0 |
|  | 600 nm | 14.1 | 13.8 |
|  | 700 nm | 14.5 | 15.2 |
|  | 800 nm | 14.9 | 17.0 |
| specular reflectance % | wave length of light 220 nm | 0.7 | 0.6 |
|  | 250 nm | 0.7 | 0.6 |
|  | 300 nm | 0.7 | 0.7 |
|  | 350 nm | 0.8 | 0.8 |
|  | 400 nm | 0.8 | 0.8 |
|  | 450 nm | 0.8 | 0.8 |
|  | 500 nm | 0.8 | 0.8 |
|  | 550 nm | 0.9 | 0.9 |
|  | 600 nm | 0.9 | 0.9 |
|  | 700 nm | 1.0 | 1.0 |
|  | 800 nm | 1.4 | 1.5 |

In recent years, there has been an increase in the demand for large-scale precision chucks or support platforms accompanying the increase in size of FPD substrates. Precision chucks provided with large-scale bases that are expressed in units of "meters" are also known. The ceramics of the present invention can also be applied to large-scale precision chucks or support platforms in FPD manufacturing devices and semiconductor manufacturing devices. Also, the ceramics manufacturing method of the present invention does not require a special atmosphere.

What is claimed is:

1. A ceramic material comprising at least 80 wt % of alumina with Mn, Ti, Fe, Si, Ca and Mg, with Mn—Al spinel ($MnO \cdot Al_2O_3$) crystals and anorthite crystals ($CaO \cdot Al_2O_3 \cdot 2SiO_2$) generated by calcination, wherein volume resistivity is $1 \times 10^{11}$ $\Omega \cdot cm$ or less.

2. The ceramic material according to claim 1, further comprising at least 2 wt % Mn-, Ti- or Fe-oxide.

3. The ceramic material according to claim 1, further comprising at least 0.5 wt % MnO.

4. The ceramic material according to claim 1, further comprising at least 0.5 wt % $TiO_2$ and at least 0.5 wt % $Fe_2O_3$.

5. The ceramic material according to claim 1, wherein specific rigidity is at least 65 $GPa \cdot cm^3/g$.

6. The ceramic material according to claim 1, wherein when light is irradiated onto a surface of ground ceramics, total reflectance is 10.3–15.0% for wavelength 220–350 nm, 11.9–16.5% for wavelength 400–550 nm, and 13.8–21.7% for wavelength 600–800 nm.

7. The ceramic material according to claim 1, wherein when light is irradiated onto a surface of ceramics having a surface roughness of 0.6 μRa, specular reflectance at 0 degrees is 0.6–0.9% for wavelength 220–350 μm, 0.8–1.0% for wavelength 400–550 nm, and 0.9–1.7% for wavelength 600–800 nm.

8. The ceramic material according to claim 1, further comprising at least 6% Si-, Ca- or Mg-oxides.

9. The ceramic material according to claim 1, further comprising at least 4 wt % $SiO_2$, at least 0.4 wt % CaO, and at least 0.4 wt % MgO.

10. A ceramics manufacturing method, comprising the steps of:
    forming a compacted body using mixed powder containing at least 80 wt % of alumina ($Al_2O_3$) as main components, at least 0.5% MnO, at least 0.5 wt % $TiO_2$, at least 0.5 wt % $Fe_2O_3$, at least 4 wt % $SiO_2$, at least 0.4 wt % CaO, and at least 0.4 wt % MgO; and
    producing Mn—Al spinel ($MnO \cdot Al_2O_3$) crystals and anorthite crystals ($CaO \cdot Al_2O_3 \cdot 2SiO_2$) by calcinating the compacted body in an LPG furnace or an electrical furnace at 1,300–1,450° C.

* * * * *

UNITED STATES PATENT AND TRADEMARK OFFICE
CERTIFICATE OF CORRECTION

| | |
|---|---|
| PATENT NO. | : 7,091,146 B2 |
| APPLICATION NO. | : 10/895091 |
| DATED | : August 15, 2006 |
| INVENTOR(S) | : Yoshiharu Okiyama et al. |

It is certified that error appears in the above-identified patent and that said Letters Patent is hereby corrected as shown below:

ON THE TITLE PAGE:

In (57) ABSTRACT:

Line 3, "($MnO.Al_2O_3$)" should read --($MnO \cdot Al_2O_3$)--.

Line 4, "($CaO.Al_2O_3.2SiO_2$)" should read --($CaO \cdot Al_2O_3 \cdot 2SiO_2$)--.

IN THE SPECIFICATION:

In column 2, line 19, "($MnO.Al_2O_3$)" should read --($MnO \cdot Al_2O_3$)--.

In column 2, line 20, "($CaO.Al_2O_3.2SiO_2$)" should read --($CaO \cdot Al_2O_3 \cdot 2SiO_2$)--.

In column 5, line 41, "($MnO\ Al_2O_3$)" should read --($MnO \cdot Al_2O_3$)--.

In column 5, line 42, "($CaO\ Al_2O_3.2SiO_2$)" should read --($CaO \cdot Al_2O_3 \cdot 2SiO_2$)--.

IN THE CLAIMS:

In column 8, line 26, "220-350 μ m" should read --220-350 nm--.

In column 8, line 42, "($MnO.Al_2O_3$)" should read --($MnO \cdot Al_2O_3$)--.

In column 8, line 43, "($CaO.Al_2O_3.2SiO_2$)" should read --($CaO \cdot Al_2O_3 \cdot 2SiO_2$)--.

Signed and Sealed this

Twenty-third Day of September, 2008

JON W. DUDAS
*Director of the United States Patent and Trademark Office*